UNITED STATES PATENT OFFICE.

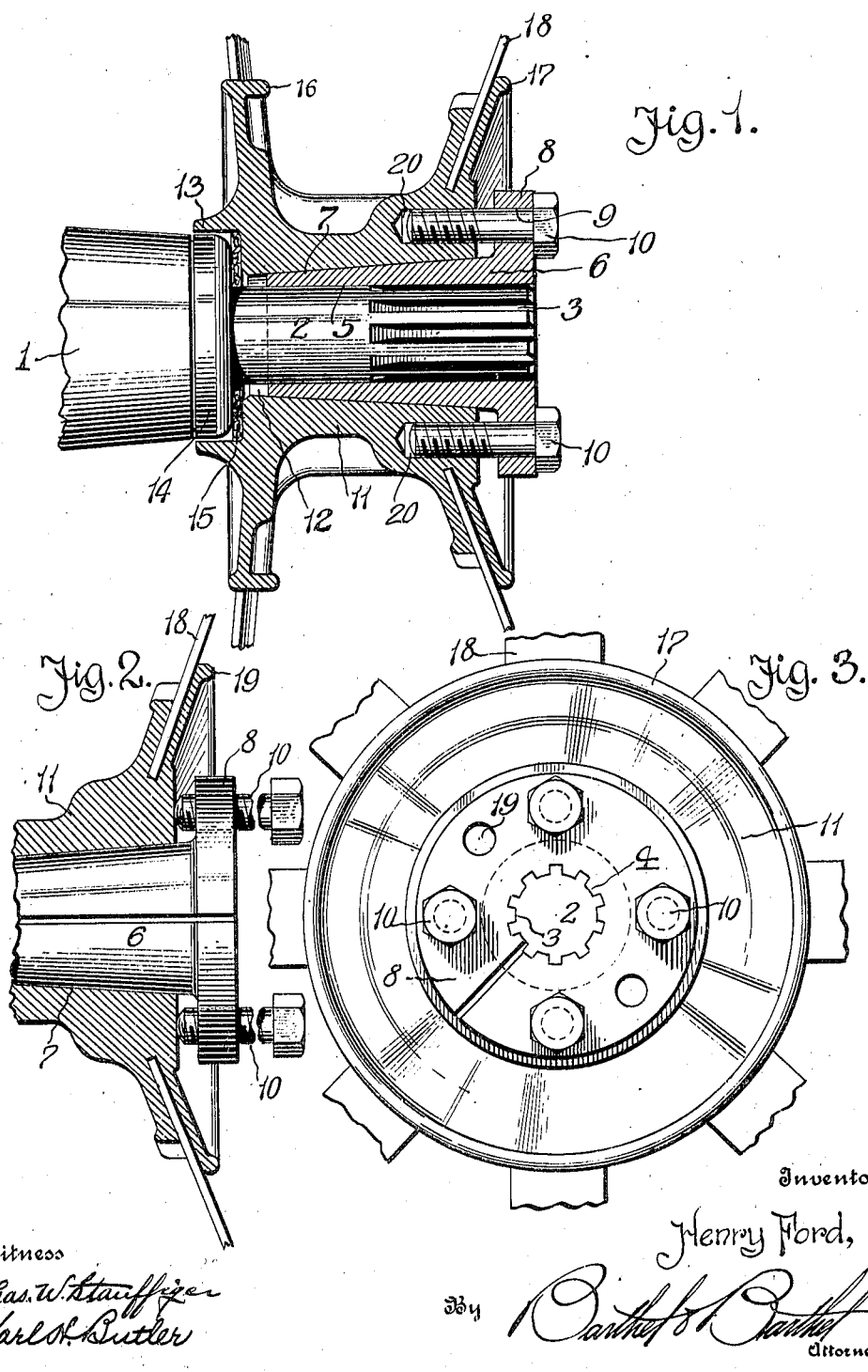

HENRY FORD, OF DEARBORN, MICHIGAN.

HUB CONSTRUCTION.

1,395,913.   Specification of Letters Patent.   Patented Nov. 1, 1921.

Application filed April 15, 1918. Serial No. 228,588.

*To all whom it may concern:*

Be it known that I, HENRY FORD, a citizen of the United States of America, residing at Dearborn, in the county of Wayne and State of Michigan, have invented certain new and useful Improvements in Hub Construction, of which the following is a specification, reference being had therein to the accompanying drawings.

This invention relates to hub construction, and has special reference to a demountable wheel for the rear axle or driven shaft of a tractor, truck or automobile, and also to means for establishing a driving relation between the wheel hub and the axle.

The object of my invention is to provide a split tapering bushing for establishing a driving relation between the wheel hub and an axle or the spindle thereof, in which the fastening means used in connection with the bushing also constitutes means for quickly removing the bushing so that the wheel hub may be removed from the axle or spindle.

I attain the above by a simple and durable mechanical construction that will be hereinafter referred to and reference will now be had to the drawing, wherein—

Figure 1 is a longitudinal sectional view of the hub construction;

Fig. 2 is a sectional view of a portion of the wheel hub, showing a portion of the bushing in elevation and the means of extracting the same from the wheel hub, and Fig. 3 is a side elevation of the hub construction.

As illustrating the hub construction now in use, I have shown a portion of the rear axle housing 1 as having a rear axle 2 protruding therefrom. The outer end or spindle of the axle has a plurality of longitudinal and circumferentially disposed grooves or rib ways 3 adapted to receive complemental ribs 4 on the inner cylindrical wall 5 of a longitudinally split bushing 6. This bushing has an outer tapering wall 7 and a peripheral flange 8, said wall tapering inwardly from the flanged or outer end of the bushing.

The flange 8 has a series of openings 9 to receive screw bolts 10, and said screw bolts are adapted to engage in the outer end of a wheel hub 11 having a tapering bore 12 to receive the bushing 6. The wheel hub 11 has the inner end thereof provided with an annular flange 13 surrounding a cover 14 and a felt washer 15, these last mentioned elements excluding dust and dirt from the end of the housing 1 and any bearings that may be therein.

The hub 11 has peripheral flanges 16 and 17 for spokes 18 and the flange 17 is dished or outwardly disposed so as to provide a certain amount of clearance or an inclosure for the flange 8 of the bushing 6.

The screw bolts 10 are adapted to be tightened to draw the wheel hub 11 and the bushing 6 together, and in doing this the split bushing is contracted about the axle 2 to such an extent that it cannot slip therefrom, thereby establishing a driving relation between the axle and the hub. The flange 8 of the bushing has diametrically opposed openings 19 with the walls thereof screw-threaded and the openings are adapted to receive two of the screw bolts 10 when it is desired to extract or force the bushing 6 out of the wheel hub 11. When the screw bolts are screwed in the openings 19, the inner ends of the screw bolts will engage the outer end of the wheel hub 11, between certain of the sockets 20 that receive the screw bolts, and by tightening or further screwing the two screw bolts, the bushings will be forced outwardly and can be removed from the outer end or spindle of the axle. Then the wheel hub can be easily removed. After the bushing 6 has been loosened or started from the end of the axle, a suitable instrument may be placed behind the flange 8 and against the flange 17 to pry the bushing out of the axle.

In placing the bushing between the axle and the wheel hub, it is preferable to evenly adjust the screw bolts 10 until the end of the axle is flush with the outer end face of the bushing 6, such position indicating the correct position of the wheel hub relative to the rear axle housing 1 or the axle 2 thereof.

What I claim is:—

1. The combination with a wheel hub, an axle, a bushing between said axle and said hub and having a driving relation to said axle, a flange on said bushing exteriorly of said hub and confronting the outer face of said hub, and means extending through the flange of said bushing connecting said bushing to said wheel hub and adapted to be repositioned in the flange of said bushing for forcing said bushing from said axle independent of said wheel hub.

2. The combination of a wheel hub having a tapered bore throughout the length thereof, an axle extending therein and provided with grooves, a tapering split bushing in the bore of said wheel hub and having ribs extending into the grooves of said axle, a flange on the outer end of said bushing confronting the outer face of the wheel hub, and screw bolts rotatable in the bushing flange and screwed in the outer face of the wheel hub and connecting the outer end of said bushing to said wheel hub, said flange having screw threaded openings so that said bolts may be re-positioned and screwed in said openings against the outer face of the wheel hub to draw said bushing from the axle independent of said wheel.

In testimony whereof I affix my signature in the presence of two witnesses.

HENRY FORD.

Witnesses:
 ROBERT E. WALTER,
 E. G. SEIBOLD.